United States Patent [19]

Poucher

[11] Patent Number: 4,772,181
[45] Date of Patent: Sep. 20, 1988

[54] BLADED ROTOR ASSEMBLY AND A CONTROL SYSTEM THEREFOR

[75] Inventor: Michael Poucher, Cheltenham, England

[73] Assignee: Dowty Rotol Limited, England

[21] Appl. No.: 910,506

[22] Filed: Sep. 23, 1986

[30] Foreign Application Priority Data

Sep. 28, 1985 [GB] United Kingdom ............... 8523975

[51] Int. Cl.$^4$ ............................................ B64C 11/48
[52] U.S. Cl. ........................................ 416/33; 416/49; 416/127; 416/130
[58] Field of Search ........................... 416/127–130, 416/157 B, 33, 48, 49, 34

[56] References Cited

U.S. PATENT DOCUMENTS

| | | | |
|---|---|---|---|
| 2,394,299 | 2/1946 | Friedrich | 416/127 |
| 2,421,514 | 6/1947 | Martin et al. | 416/34 |
| 2,525,260 | 10/1950 | Geyer | 416/33 |
| 2,619,182 | 11/1952 | Martin | 416/34 |
| 2,761,517 | 9/1956 | Detamore et al. | 416/127 X |
| 2,804,154 | 8/1957 | Treseder et al. | 416/49 X |
| 2,857,007 | 10/1958 | Detamore et al. | 416/61 X |
| 2,948,343 | 8/1960 | Conn et al. | 416/130 X |
| 2,980,188 | 4/1961 | Allen et al. | 416/48 X |
| 4,563,129 | 1/1986 | Pagluica | 416/129 |
| 4,591,313 | 5/1986 | Miyakake et al. | 416/155 |

FOREIGN PATENT DOCUMENTS

| | | | |
|---|---|---|---|
| 865943 | 6/1941 | France | 416/129 |
| 402942 | 3/1943 | Italy | 416/129 |
| 408010 | 12/1944 | Italy | 416/120 |
| 704809 | 3/1954 | United Kingdom | 416/33 |
| 2145777 | 4/1985 | United Kingdom | 416/129 |

Primary Examiner—Everette A. Powell, Jr.
Attorney, Agent, or Firm—Hayes, Davis & Soloway

[57] ABSTRACT

A counterrotatable bladed rotor assembly drivable by a rotatable shaft comprises a leading propeller, a trailing propeller, and a gearbox located axially between the two propellers and enclosed by a non-rotatable casing having an end for attachment to a support structure. The gearbox has a first output shaft to the leading propeller and a second output shaft to the trailing propeller. A first fluid-pressure operable actuator is provided to vary the pitch of the blades of the leading propeller, and a second fluid-pressure operable actuator is provided to vary the pitch of the blades of the trailing propeller. In addition passageways are provided to connect the first and second actuators to a source of fluid under pressure. The casing rotatably supports the second output shaft at a position between the gearbox and the leading propeller and rotatably supports the first output shaft at a position between the gearbox and the trailing propeller. In this manner a compact and lightweight support arrangement is provided for the propellers.

28 Claims, 5 Drawing Sheets

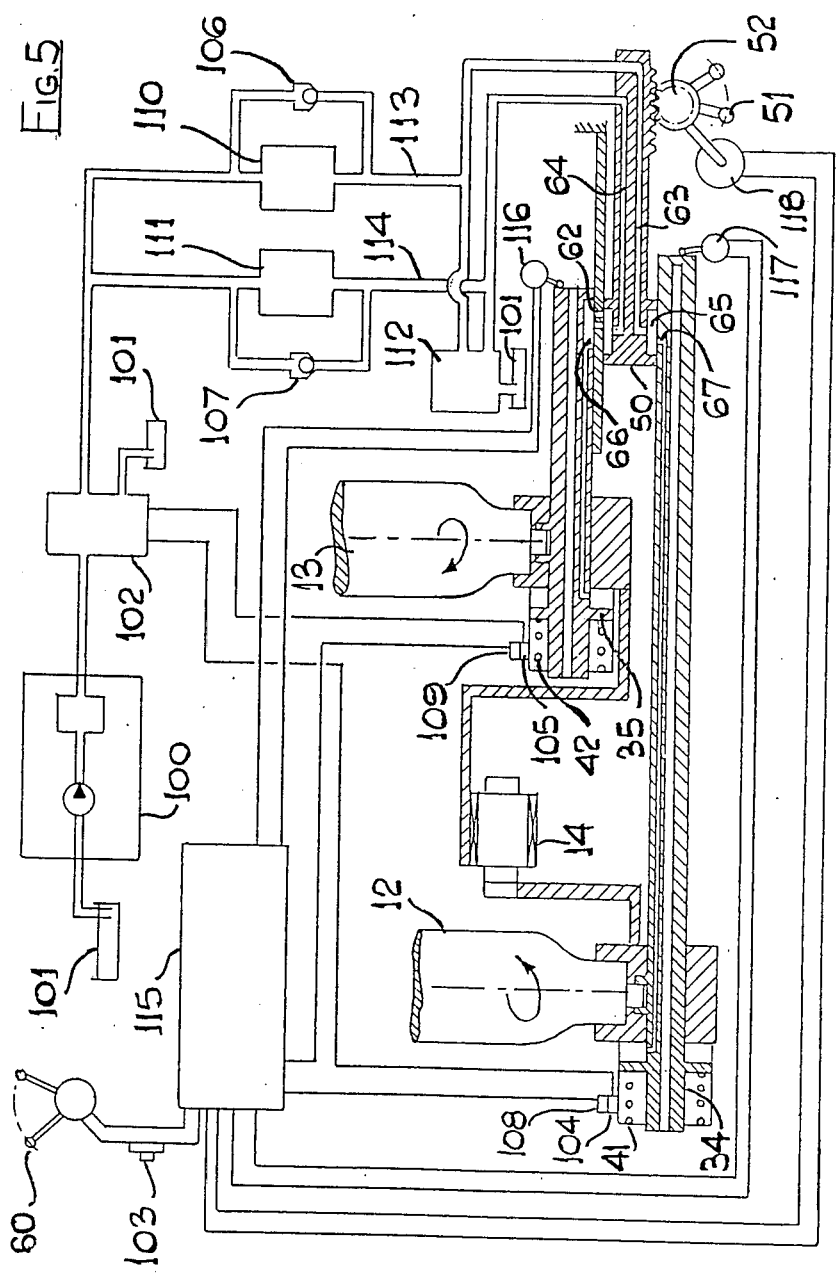

BLADED ROTOR ASSEMBLY AND A CONTROL SYSTEM THEREFOR

BACKGROUND OF THE INVENTION

This invention relates to bladed rotor assemblies and in particular to counterrotatable bladed rotor assemblies and the control thereof.

It is known to provide a counterrotatable bladed rotor assembly drivable by a rotatable shaft having two counterrotatable bladed rotors each of which has a number of rotor blades the pitch of which may be varied by actuator means and a gearbox to transfer drive from said rotatable shaft to each of the bladed rotors.

It is an object of this invention to provide a bladed rotor assembly that is light in weight but retains good support for the bladed rotors.

It is a second object of this invention to provide a simple but safe control system for a counterrotatable bladed rotor assembly.

SUMMARY OF THE INVENTION

According to a first aspect of the invention there is provided a counterrotatable bladed rotor assembly drivable by a rotatable shaft, the assembly comprising a first bladed rotor having a plurality of rotor blades, a second bladed rotor having a plurality of rotor blades, a gearbox located axially between the first and second bladed rotors and enclosed by a non-rotatable casing having an end for attachment to a support structure, the gearbox having a first output shaft to the first bladed rotor and a second output shaft to the second bladed rotor, a first fluid-pressure operable actuator to vary the pitch of the rotor blades of the first bladed rotor, a second fluid-pressure operable actuator to vary the pitch of the rotor blades of the second bladed rotor, and means to connect said first and second fluid-pressure operable actuators to a source of fluid under pressure, the arrangement being such that the casing rotatably supports the second output shaft at a position between the gearbox and the first bladed rotor and rotatably supports the first output shaft at a position between the gearbox and the second bladed rotor.

The casing may further rotatably support the second bladed rotor at a position between the second bladed rotor and the end of the casing for attachment to a support structure.

The casing may for at least part of its length be surrounded by the second output shaft.

Preferably, the casing may include passageways formed integrally therein to transfer lubricating oil to and from the gearbox.

Preferably, the gearbox is of the epicyclic type having a sun gear for connection to the rotatable shaft, a number of planet gears rotatable about and in mesh with the sun gear and an annulus gear in mesh with and driven by the planet gears.

The first output shaft may be driven by a carrier member supporting the planet gears.

The second output shaft may be driven by the annulus gear.

The first actuator may have a tubular part which extends axially along the bladed rotor assembly and traverses the gearbox.

Preferably, the tubular part of the first actuator includes fluid-pressure transfer means to connect the first actuator to part of the means to connect it to the source of fluid under pressure.

Advantageously, the tubular part of the first actuator may have a number of slots in it to allow co-operation between the sun gear and the planet gears.

Preferably, at least one of a number of spokes formed by the slots in the first actuator tube includes a passageway forming part of the fluid-pressure transfer means.

According to a second aspect of the invention there is provided a speed control system for a bladed rotor assembly of the type in which first and second counterrotatable bladed rotors are drivable by a rotatable shaft through a gearbox located axially between the bladed rotors, each of the bladed rotors having a number of variable pitch rotor blades, the speed control system comprising an electronic control unit responsive to a desired speed signal from a pilot controlled signalling means and two speed feedback signals from first and second speed feedback means for measuring the rotational speed of each of the bladed rotors to supply a control signal to first and second electro-hydraulic valves, a source of fluid under pressure connectable to said first and second electro-hydraulic valves, first and second fluid-pressure operable actuators to vary the pitch of said rotor blades and valve means to connect said first and second actuators to said first and second electro-hydraulic valves, the arrangement being such that a single supply of fluid under pressure is provided for connection from the first electro-hydraulic valve to the first actuator through said valve means and a single supply of fluid under pressure is provided for connection from the second electro-hydraulic valve to the second actuator through said valve means.

The supply signal to the first electro-hydraulic valve may be proportional to the difference between the signal received from the pilot controlled signalling means and one of the speed feedback means and the supply signal to the second electro-hydraulic valve may be proportional to the difference between the signals received from the first and second speed feedback means.

The pilot controlled signalling means may be a speed control lever having a speed sensor unit attached thereto.

The speed control system may further comprise an overspeed governor to prevent either of the bladed rotors exceeding a predetermined rotational speed.

The valve means may be mechanical follow-up valve means connected to the first and second actuators to limit the range of pitch angles obtainable in the event of a malfunction of the electronic control unit.

The follow-up valve means may be operable by pilot control means to vary the range of pitch angles obtainable.

Preferably, the follow-up valve means comprises four tubular members fitted one within the other to form first and second control valves.

Preferably, the innermost of the tubular members may be formed by an actuator tube of the first actuator, the actuator tube being adapted to connect a piston of the first actuator to the rotor blades of the first bladed rotor.

Preferably, the outermost of the tubular members may be formed by an actuator tube of the second actuator, the actuator tube being adapted to connect a piston of the second actuator to the rotor blades of the second bladed rotor.

Advantageously, the actuator tube of the second actuator may be adapted to co-operate with a tubular extension of a casing used to enclose the gearbox, the tubular extension forming the third of said tubular members.

A pilot movable control tube may be interposed between the third tubular member and the actuator tube of the first actuator to form the fourth of said tubular members.

The control tube may be movable by a linkage connected to a power control lever to form the pilot control means.

Preferably the control tube co-operates with the actuator tube of the first actuator to form said first control valve and with the tubular extension and actuator tube of the second actuator to form said second control valve.

The control tube may have two passageways formed integrally therein, one to supply fluid under pressure from the first electro-hydraulic valve to the first control valve and the other to supply fluid under pressure from the second electro-hydraulic valve to the second control valve.

According to a third aspect of the invention there is provided a control system for a bladed rotor assembly of the type in which first and second counterrotatable bladed rotors are drivable by a rotatable shaft through a gearbox located axially between the bladed rotors, each of the bladed rotors having a number of variable pitch rotor blades, the pitch control system comprising an electronic control unit responsive to a desired pitch signal from a pilot controlled signalling means and two pitch feedback signals from first and second pitch feedback means for measuring the pitch of each of the bladed rotors to supply a control signal to first and second electro-hydraulic valves, a source of fluid under pressure connectable to said first and second electro-hydraulic valves, first and second fluid pressure operable actuators to vary the pitch of said rotor blades and valve means to connect said first and second actuators to said first and second electro-hydraulic valves, the arrangement being such that a single supply of fluid under pressure is provided for connection from the first electro-hydraulic valve to the first actuator through said valve means and a single supply of fluid under pressure is provided for connection from the second electro-hydraulic valve to the second actuator through said valve means, in which the supply signal to the first electro-hydraulic valve is proportional to the difference between the signal received from the pilot controlled signalling means and the pitch feedback signal received from the first pitch feedback means, and the supply signal to the second electro-hydraulic valve is proportional to the difference between the signal received from the pilot controlled signalling means and the pitch feedback signal received from the second pitch feedback means.

The pilot controlled signalling means may be a power control lever having a pitch sensor unit attached thereto.

The pitch control system may further comprise an overspeed governor to prevent either of the bladed rotors exceeding a predetermined rotational speed.

The valve means may be mechanical follow-up valve means connected to the first and second actuators to limited the range of pitch angles obtainable in the event of a malfunction of the electronic control unit.

Preferably, the follow-up valve means comprises four tubular members fitted one within the other to form first and second control valves.

The follow-up means may be operable by pilot control means to vary the range of pitch angles obtainable.

Preferably, the innermost of the tubular members may be formed by an actuator tube of the first actuator, the actuator tube being adapted to connect a piston of the first actuator to the rotor blades of the first bladed rotor.

Preferably, the outermost of the tubular members may be formed by an actuator tube of the second actuator, the actuator tube being adapted to connect a piston of the second actuator to the rotor blades of the second bladed rotor.

Advantageously, the actuator tube of the second actuator may be adapted to co-operate with a tubular extension of a casing used to enclose the gearbox, said tubular extension forming the third of said tubular members.

A pilot movable control tube may be interposed between the third tubular member and the actuator tube of the first actuator to form the fourth of said tubular members.

The control tube may be movable by a linkage connected to a power control lever to form the pilot control means.

Preferably, the control tube co-operates with the actuator tube of the first actuator to form said first control valve and with the tubular extension and actuator tube of the second actuator to form said second control valve.

The control tube may have two passageways formed integrally therein, one to supply fluid under pressure from the first electro-hydraulic valve to the first control valve and the other to supply fluid under pressure from the second electro-hydraulic valve to the second control valve.

Advantageously, the first pitch feedback means is a displacement transducer operatively connected to the actuator tube of the first actuator and the second pitch feedback means is a displacement transducer operatively connected to the actuator tube of the second actuator.

It is a first advantage of the invention that the bladed rotor assembly provided is compact and lightweight but retains good support for the bladed rotors.

It is a second advantage of the invention that a positive supply and return of lubrication oil is made to the gearbox through a non-rotary member.

It is a third advantage of the invention that a simple control system is provided requiring only one feed of fluid under pressure to each of the pitch change actuators.

It is a further advantage of the invention that a mechanical follow-up valve is provided to prevent large pitch changes from occurring in the event of an electrical failure.

It is a further advantage of the invention that a simple control system is provided to control the pitch of each of the bladed rotors separately.

BRIEF DESCRIPTION OF THE DRAWINGS

The invention will now be described by way of example with reference to the accompanying drawings of which:

FIG. 5: is a schematic line drawing of a control system according to second and third aspects of the invention.

DETAILED DESCRIPTION OF THE DRAWINGS

Figure 1:
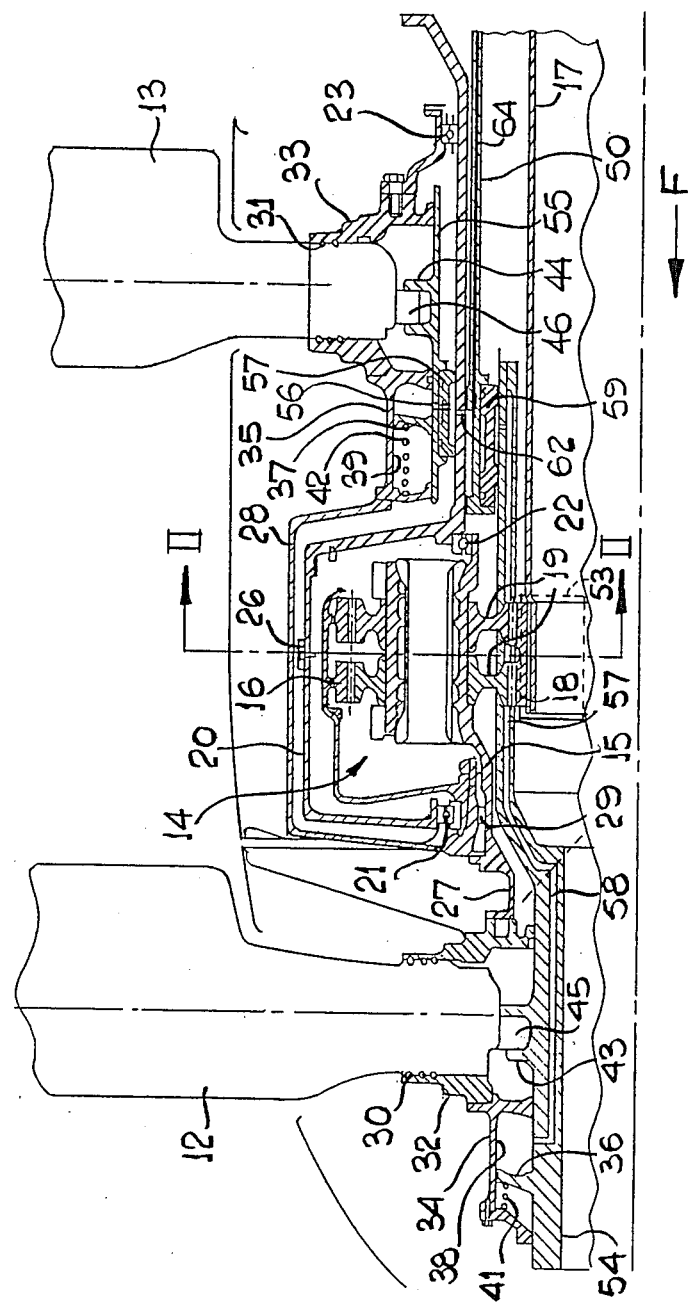
FIG. 1: is a cross-section through a bladed rotor assembly according to the invention.
Figure 2:
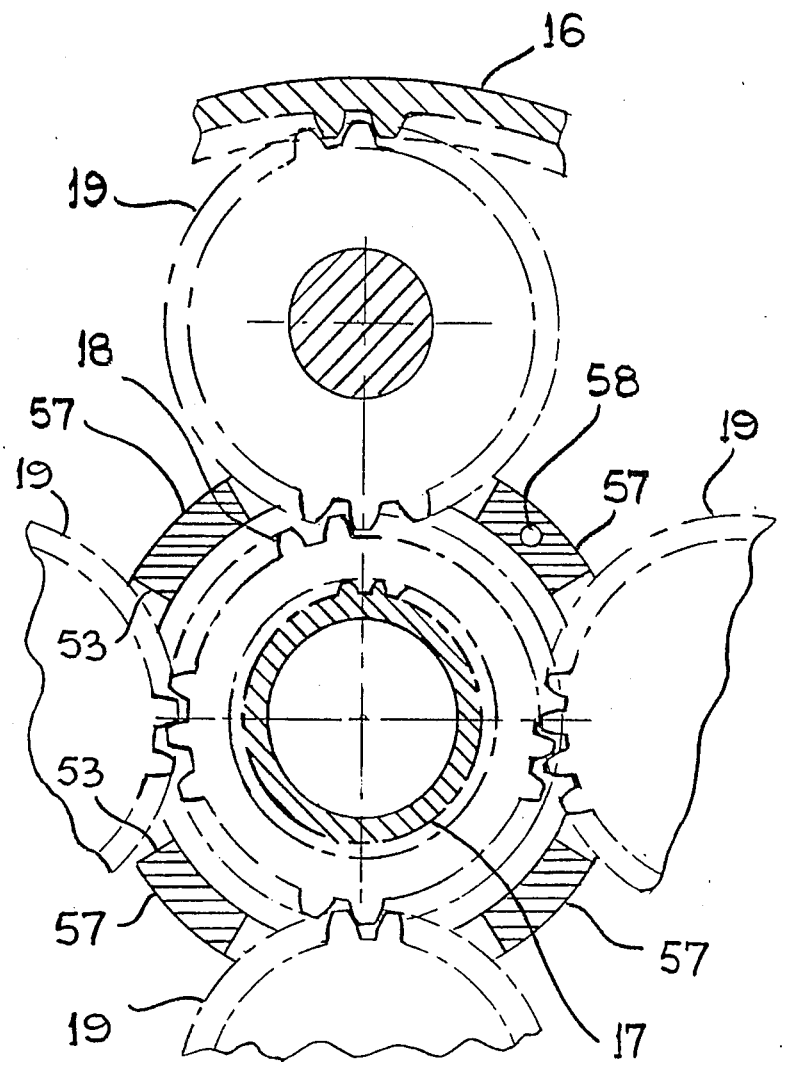
FIG. 2: is a cross-section on the line II—II on FIG. 1 showing the relative positions of the gears in the gearbox.

With reference to FIGS. 1 to 4 there is shown a bladed rotor assembly having a leading propeller 12, a trailing propeller 13 and a gearbox 14 located axially between the two propellers 12, 13.

The two propellers 12, 13 are counterrotatable with respect to one another and are both arranged to be coarse seeking throughout the operating range.

The gearbox 14 is of an epicyclic type and has an output to the leading propeller 12 from a planet carrier 15 by means of a drive shaft 27 and an output to the trailing propeller 13 from an annulus gear 16 by means of a drive shaft 28. The gearbox 14 is driven by a single input shaft 17 from an engine (not shown), the input shaft 17 having a sun gear 18 drivingly connected to it to mesh with four planet gears 19 supported by the planet carrier 15.

The gearbox 14 is surrounded by a casing 20 which supports the main rotary bearings 21, 22, 23 for both of the propellers 12, 13. The casing 20 has an end for attachment to a support structure (not shown) and is adapted by means of passageways formed in it to transfer lubricating oil to the gearbox 14 and to return oil from the gearbox 14 to a reservoir (shown on FIG. 5).

The front rotary bearing 21 for the trailing propeller 13 is positioned between the gearbox 14 and the leading propeller 12 and the rear bearing 23 at a position near the attachment end of the casing 20. The rear bearing 22 for the leading propeller 12 is positioned between the gearbox 14 and the trailing propeller 13.

The front rotary bearing 29 for the leading propeller 12 is interposed between the drive shaft 27 and the drive shaft 28 at a position between the gearbox 14 and the leading propeller 12.

A number of scoops 26 are provided to scavenge any oil that has leaked from the gearbox 14 into a surrounding annular cavity formed by the casing 20 and the drive shaft 28 to the trailing propeller 13.

Each of the propellers 12, 13 has four rotor blades, each of which is supported at its root in a respective propeller hub 32, 33 by a bearing 30, 31.

Each of the rotor blades of the leading propeller 12 is rotatable about its pitch-change axis by a first actuator 34 to effect a change of pitch and each of the rotor blades of the trailing propeller 13 is likewise rotatable by a second actuator 35.

The first actuator 34 comprises a piston 36 moveable in a cylinder 38, a cross-head 43 for engagement with a pin 45 attached to the root of each of the rotor blades, an actuator tube 54 joining the piston 36 to the cross-head 43 and a return spring 41 to bias the piston 36 in a pitch increasing direction. The actuator tube 54 traverses the gearbox 14 and has four slots 53 in it to allow the planet gears to mesh with the sun gear 18.

The second actuator 35 likewise comprises a piston 37 moveable in a cylinder 39, a cross-head 44 for engagement with a pin 46, an actuator tube 55 and a return spring 42.

Both of the actuators 34, 35 are operative to reduce the pitch of the propellers 12, 13 when fluid pressure is admitted to the cylinders 38, 39 the pistons 36, 37 being moved against the return springs 41, 42 and the coarse seeking forces of the propellers 12, 13.

Fluid pressure is admitted to the first actuator 34 through a passageway 58 which extends along the actuator tube 54 and traverses the gearbox 14 through one of the spokes 57 formed between the slots 53.

The passageway 58 connects the first actuator 34 to a first control valve the spool 59 of which is located by a control tube 50. The second actuator 35 is connected to a second control valve by a passageway 56 in the actuator tube 55.

A spool 57 of the second control valve is located by a circumferential recess in the actuator tube 55 and co-operates with a helical row of holes 62 in a tubular extension of the casing 20 to form said second control valve.

The control tube 50 is axially moveable by pilot control means in the form of a power control lever 51 and associated linkages 52 (See FIG. 5) to operate the first and second control valves. The control tube 50 has two passageways 63, 64 formed in it, one of which supplies fluid pressure to the spool valve for the first actuator 34 and the other of which to the spool valve for the second actuator 35.

The first and second control valves, the tubular extension of the casing 20 and the control tube 50 form a follow up valve means between the rotating actuators 34, 35 and a non-rotatable source of fluid pressure. The first and second control valves can be used to control the pitch of the propellers 12, 13 or as fine pitch stops depending upon the operating conditions of the aircraft.

Figure 3:
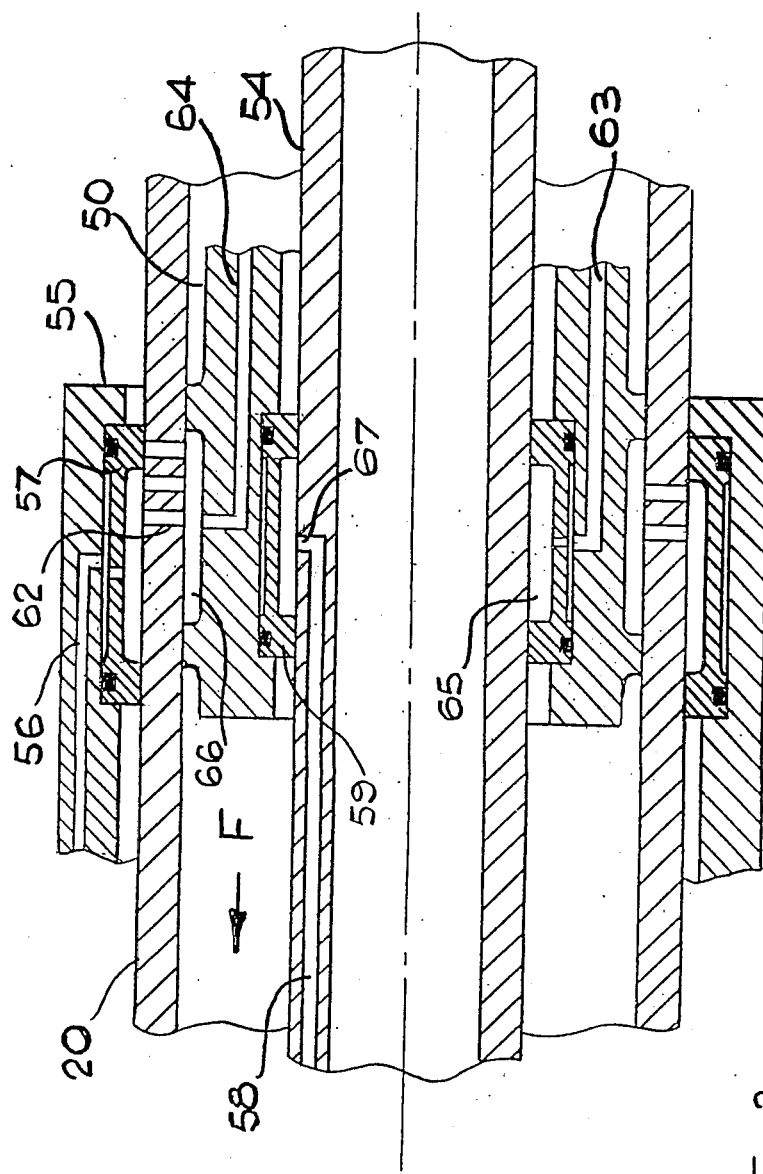
FIG. 3: is a cross-section similar to that of FIG. 1 but showing on an enlarged scale a followup valve according to second and third aspects of the invention.
Figure 4:
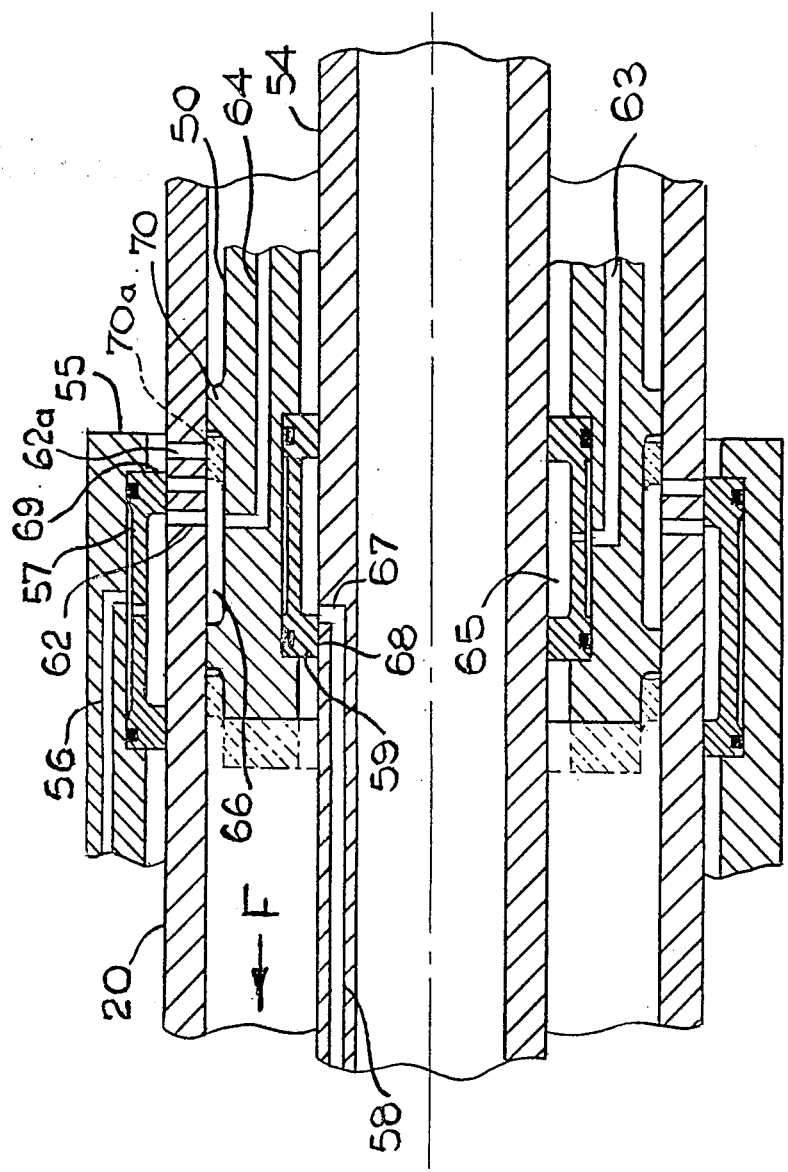
FIG. 4: is a cross-section similar to FIG. 3 but showing the follow up in an alternative position.

Operation of the first and second control valves can be more readily understood with reference to FIGS. 3 and 4.

In FIG. 3 the first and second control valves are shown in a position for normal or constant speed operation. Fluid under pressure from a source (not shown) passes through the passageways 63, 64 to the supply galleries 65, 66. The supply gallery 65 is positioned adjacent a supply port 67 leading to the passageway 58 and thence to the first actuator 34. The supply gallery 66 is positioned adjacent the holes 62 which co-operate with the spool 57 to allow fluid-pressure into the passageway 56 and thence to the second actuator 35.

By reference to FIG. 1 it will be understood by those skilled in the art that if the fluid-pressure to either of the actuators 34, 35 is increased the respective actuator tube 54, 55 will be moved in the direction of arrow F until the positions shown in FIG. 4 is reached.

The positions of the spool valves as shown in FIG. 4 correspond to the fine pitch stop condition in which the supply of fluid-pressure to the first actuator 34 has been cut off by a shoulder 68 of the spool 59 blocking the supply port.

A shoulder 69 of the spool 57 has traversed some of the holes 62 thereby allowing a loss of fluid-pressure to occur through the hole 62a. The fluid lost through the hole 62a is returned to a reservoir (not shown) for recycling.

If it is required to obtain a finer pitch than that which the fine pitch stop allows, the pilot must move the control tube 50 in the direction of arrow F. If the control tube 50 is moved in the direction of arrow F the shoulder 68 will uncover the supply port 67 and a shoulder 70 of the control tube 50 will disconnect the hole 62a from the supply gallery 66 (as shown by 70a) to prevent the loss of fluid therefrom thereby allowing the fluid pressure supplied to the second actuator 35 to increase.

This process can be continued until the control tube 50 has been moved as far in the direction of arrow F as is possible. It will be appreciated by those skilled in the art that any movement of the control tube 50 will be followed by a corresponding follow up movement of the actuator tubes 54, 55.

With reference to FIG. 5 there is shown a source of fluid-pressure in the form of a fluid-pressure supply 100 which supplies fluid at pressure from a reservoir 101 to an overspeed governor 102. The overspeed governor 102 is operative to return fluid at pressure to the reservoir 101 if the rotational speed of either of the propellers 12, 13 as measured by the sensors 104, 105 is below the predetermined level.

Each of the elector-hydraulic valves 110, 111 has an outlet 113, 114 to the follow up valve means. Each of the outlets 113, 114 is connected through an electrically operable dump valve 112 to the reservoir 101 to allow the propellers to be rapidly feathered in the event of a control system failure. Each of the electrohydraulic valves 110, 111 is bypassed by a non-return valve 106, 107 to allow fluid-pressure to be vented back through the overspeed governor 102 to the reservoir 101 in the event of the respective electro-hydraulic valve 110, 111 becoming inoperative in a closed position.

The outlet 113 from the first electro-hydraulic valve 110 is connected to the passageway 63 in the control tube 50 and the outlet 114 is connected to the passageway 64 in the control tube 50.

The first and second electro-hydraulic valves 110, 111 are controlled independently of one another by an electronic control unit 115 to provide an individual single line fluid pressure supply to each of the actuators 34, 35.

The electronic control unit 115 sends an output signal to each of the electro-hydraulic valves 110, 111 to vary the fluid-pressure supplied to each of the actuators 34, 35. The electronic control unit 115 receives input signals from a pilot speed lever sensor unit 103 operatively connected to a pilot's speed lever 60 and from two propeller speed feedback probes 108, 109 one for each of the propellers 12, 13.

The speed lever 60 is used by the pilot to set the desired rotational speed of the propellers 12, 13.

The magnitude of the fluid-pressure sent to each of the actuators 34, 35 will depend upon the signals received from the feedback probes 108, 109, the sensor unit 103 and the internal programming of the electronic control unit 115 itself.

In the constant speed operating mode the signal sent to the first electro-hydraulic valve 110 is proportional to the difference between the actual speed of the leading propeller 12 as signalled by the feedback probe 108 and the desired speed as signalled by the speed sensor unit 103 and the signal sent to the second electro-hydraulic valve 111 is proportional to the difference between the actual speeds of the leading and trailing propellers 12 and 13 as signalled by the feedback probes 108, 109.

In the normal or constant speed range the speed of the propellers 12, 13 is controlled by the electronic control unit 115 varying the pitch of the propellers 12, 13 through the servo valves 110, 111 and the actuators 34, 35 over a range determined by the relative positions and sizes of the supply galleries 65, 66 and the apertures 67, 62 as described with respect to the valve and coupling assembly. If a smaller pitch angle or a negative one is required then the pilot must physically displace the control tube 50 by means of the power lever 51 and the linkage 52.

The follow up valve means therefore performs two separate tasks. In the normal flight range it merely acts as a fine pitch stop in case of an electronic control failure whereas in the fine or negative pitch range it actually controls the pitch of the propellers 12, 13.

The control system described above can be easily adapted to allow the pitch of the bladed rotor assembly to be controlled electronically across the entire operating range by replacing the speed probes 108, 109 with pitch position sensors 116, 117, which measure the position of the actuator tubes 54, 55 and by replacing the speed lever sensor 103 with a power lever sensor 118.

The pitch position sensors 116, 117 are rotary potentiometer displacement transducers operatively co-operating each with a respective actuator tube 54, 55.

When using electronic pitch control, tube 50 follows up the actuator tubes 54, 55 at all times so that in the event of a electronic control unit malfunction the pitch of the propellers is limited by the position of the control tube 50.

The follow up valve means is therefore only used to provide a fine pitch stop, the position of which is set by the relative position of the control tube 50.

It will be appreciated by those skilled in the art that there is no reason why both speed and pitch control cannot be provided by one control system allowing the pilot to choose between speed or pitch control by merely operating a changeover switch.

Although the invention has been described with reference to a specific example of a bladed rotor assembly it is not limited to the specific constructional features described. The displacement transducer sensors for example could be linear voltage differential transformers and not the rotary potentiometers described.

The overspeed governor could be positioned at any point between the source of fluid at pressure and the actuators.

The speed and power levers could be replaced by other means of setting their particular parameters such as a digital key pad.

The electronic control unit could be included as part of a total flight management control system.

I claim:

1. A speed control system for a counter-rotatable bladed rotor assembly which comprises:
   (a) a rotatable shaft to drive first and second counter-rotatable bladed rotors;
   (b) a gearbox axially located between the first and second counter-rotatable bladed rotors;
   (c) first and second electro-hydraulic valves;
   (d) first and second fluid pressure operable actuators to vary the pitch of the blades of the bladed rotor assembly responsive to fluid under pressure controlled respectively by the first and second electro-control valves.
   (e) valve means to connect the first and second fluid pressure operable actuators to the first and second electro-hydraulic valves;
   (f) a first source of fluid under pressure connected to the first fluid pressure operable actuator and the first electro-hydraulic valve; and
   (g) a second source of fluid under pressure connected to the second fluid pressure operable actuator and the second electro-hydraulic valve; wherein the speed control system comprises:
an electronic control unit, responsive to a signal indicating desired rotational speed of the rotors set by the pilot and to first and second rotor speed feedback means for relaying rotational speed of the first and second rotor respectively to provide a separate control signal to control the respective electro-hydraulic valves to separately control rotational speed of the first and second rotors to said desired speed.

2. A speed control system as claimed in claim 1, wherein the control signal to the first electro-hydraulic valve is dependent upon the difference between the signal indicating speed set by the pilot and the associated one of the speed feedback means, and the control signal to the second electro-hydraulic valve is dependent upon the difference between the signals from the first and second speed feedback means.

3. A speed control system as claimed in claim 1, which further comprises an overspeed governor to prevent either of the bladed rotors exceeding a predetermined rotational speed.

4. A speed control system as claimed in claim 1, wherein the valve means is a mechanical follow-up valve means connected to the first and second actuators so as to limit the range of pitch angles obtainable in the event of a malfunction of the electronic control unit.

5. A speed control system as claimed in claim 4, wherein the follow-up valve means is operable by pilot control means so as to vary the range of pitch angles.

6. A speed control system as claimed in claim 5, wherein the follow-up valve means comprises four tubular members fitted one within the other to form first and second control valves.

7. A speed control system as claimed in claim 6, wherein the innermost of the tubular members is formed by an actuator tube of the first actuator, the actuator tube being adapted to connect a piston of the first actuator to the rotor blades of the first bladed rotor.

8. A speed control system as claimed in claim 7, wherein the outermost of the tubular members is formed by an actuator tube of the second actuator, the actuator tube being adapted to connect a piston of the second actuator to the rotor blades of the second bladed rotor.

9. A speed control system as claimed in claim 8, wherein the actuator tube of the second actuator is adapted to co-operate with a tubular extension of a casing used to enclose a gearbox, the tubular extension forming the third of said tubular members.

10. A speed control system as claimed in claim 9 wherein a pilot moveable control tube is interposed between the third tubular member and the actuator tube of the first actuator to form the fourth of said tubular members.

11. A speed control system as claimed in claim 10, wherein the control tube is moveable by a linkage connected to a power control lever to form the pilot control means.

12. A speed control system as claimed in claim 10, wherein the control tube co-operates with the actuator tube of the first actuator to form said first control valve and with the tubular extension and actuator tube of the second actuator to form said second control valve.

13. A speed control system as claimed in claim 10, wherein the control tube has two passageways formed integrally therein, one to supply fluid under pressure from the first electro-hydraulic valve to the first control valve and the other to supply fluid under pressure from the second electro-hydraluic valve to the second control valve.

14. A pitch control system for a bladed rotor assembly of the type in which first and second counter-rotatable bladed rotors are drivable by a rotatable shaft through a gearbox located axially between the bladed rotors, each of the bladed rotors has a number of variable pitch rotor blades, the pitch control system comprising an electronic control unit responsive to a desired pitch signal from a pilot controlled signalling means and two pitch feedback signals from first and second pitch feedbach means for measuring pitch of each of the bladed rotors to supply a control signal to first and second electro-hydraulic valves, a source of fluid under pressure connectable to said first and second electro-hydraulic valves, first and second fluid-pressure operable actuators to vary the pitch of said rotor blades and valve means to connect said first and second actuators to said first and second electro-hydraulic valves, the arrangement being such that a single supply of fluid under pressure is provided for connection from the first electro-hyraulic valve to the first actuator through said valve means and a single supply of fluid under pressure is provided for connection from the second electro-hydraulic valve to the second actuator through said valve means, in which the supply signal to the first electro-hydraulic valve is proportional to the difference between the signal received from the pilot controlled signalling means and the pitch feedback signal received from the first pitch feedback means, and the supply signal to the second electro-hydraulic valve is proportional to the difference between the signal received from the pilot controlled signalling means and the pitch feedback signal received from the second pitch feedback means.

15. A pitch control system as claimed in claim 14, further comprising the pilot controlled signalling means which is in the form of a power control lever having a pitch sensor unit attached thereto.

16. A pitch control system as claimed in claim 14, further comprising an overspeed governor to prevent either of the bladed rotors exceeding a predetermined rotational speed.

17. A pitch control system as claimed in claim 14, wherein the valve means is in the form of mechanical follow-up valve means connected to the first and second actuators to limit the range of pitch angles obtainable in the event a malfunction of the electronic control unit.

18. A pitch control system as claimed in claim 17, wherein the follow-up valve means comprises four tubular members fitted one within the other to form first and second control valves.

19. A pitch control system as claimed in claim 18, wherein the follow-up valve means is operable by pilot control means to vary the range of pitch angles obtainable.

20. A pitch control system as claimed in claim 19, wherein the innermost of the tubular members is formed by an actuator tube of the first actuator, the actuator tube being adapted to connect a piston of the first actuator to the rotor blades of the first bladed rotor.

21. A pitch control system as claimed in claim 20, wherein the outermost of the tubular members is formed by an actuator tube of the second actuator, the actuator tube being adapted to connect a piston of the second actuator to the rotor blades of the second bladed rotor.

22. A pitch control system as claimed in claim 21, wherein the actuator tube of the second actuator is adapted to co-operate with a tubular extension of a casing used to enclose the gearbox, said tubular extension forming the third of said tubular members.

23. A pitch control system as claimed in claim 22, wherein a pilot moveable control tube is interposed between the third tubular member and the actuator tube of the first actuator to form the fourth of said tubular members.

24. A pitch control system as claimed in claim 22, wherein the control tube is moveable by a linkage connected to a power control lever to form the pilot control means.

25. A pitch control system as claimed in claim 22, wherein the control tube co-operates with the actuator tube of the first actuator to form said first control valve with the tubular extension and actuator tube of the second actuator to form said second control valve.

26. A pitch control system as claimed in claim 22, wherein the control tube has two passageways formed integrally therein, one to supply fluid under pressure from the first electro-hydraulic valve to the first control valve and the other to supply fluid under pressure from the second electro-hydraulic valve to the second control valve.

27. A pitch control system as claimed in claim 22, wherein the first pitch feedback means is a displacement transducer operatively connected to the actuator tube of the first actuator and the second pitch feedback means is a displacement transducer operatively connected to the actuator tube of the second actuator.

28. A counter rotatable propeller blade assembly incorporating a speed control system as claimed in claim 1.

* * * * *